United States Patent Office 3,002,618
Patented Oct. 3, 1961

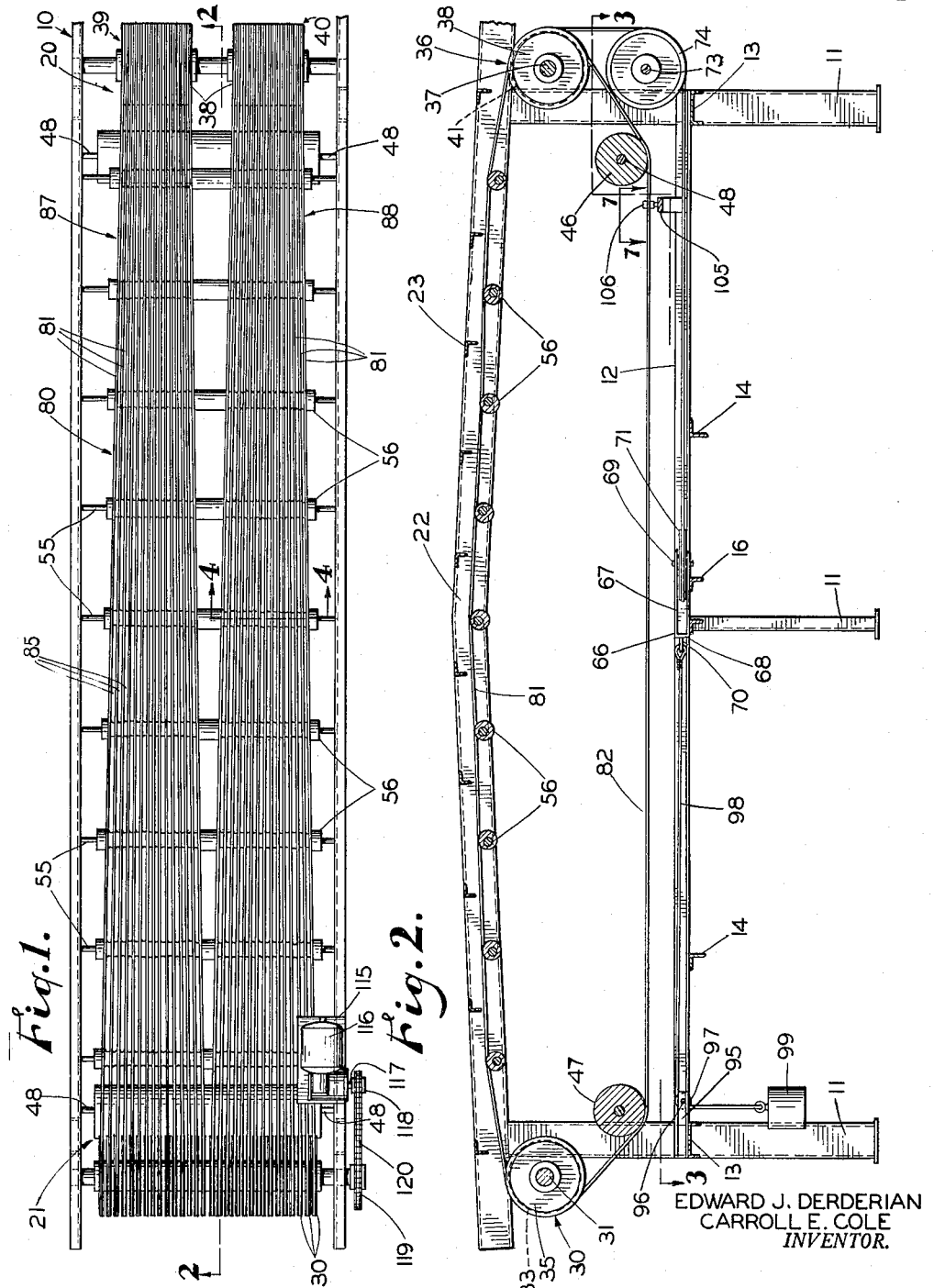

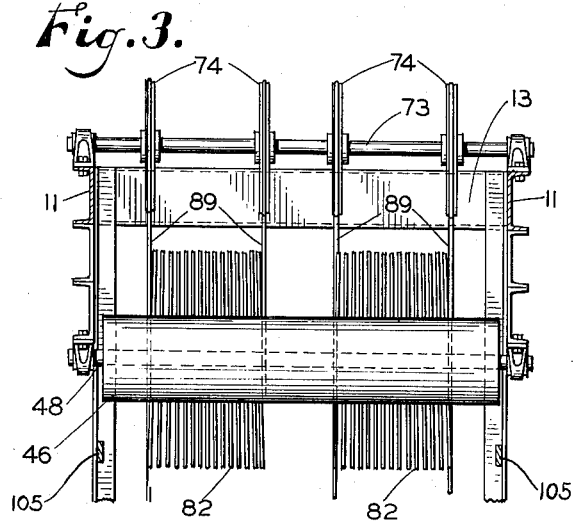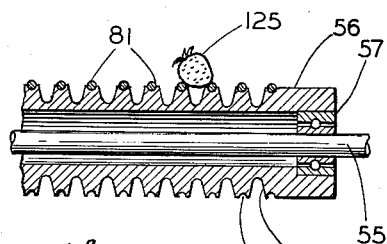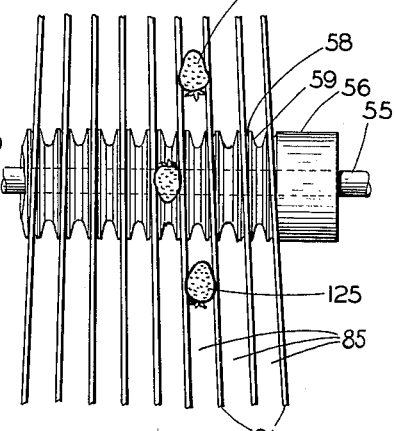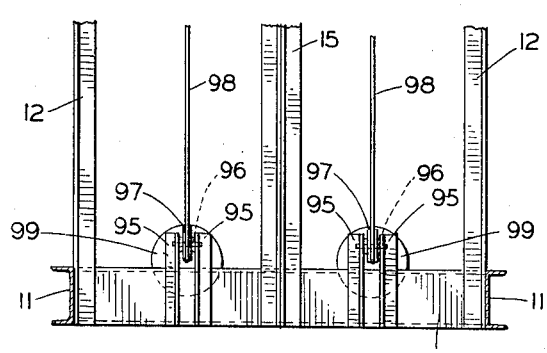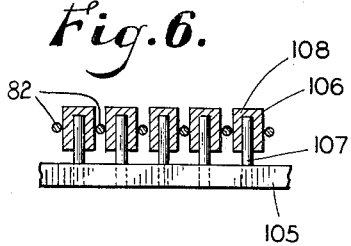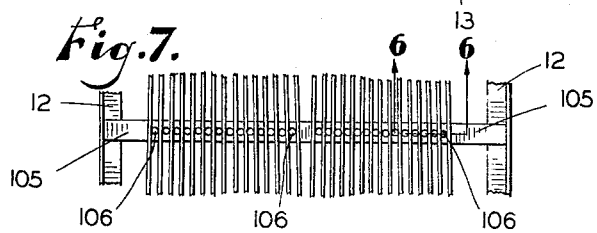

3,002,618
ARTICLE SIZING MACHINE
Edward J. Derderian, 4514 N. Wilson Ave., and Carroll E. Cole, 4386 Wilson Ave., both of Fresno, Calif.
Filed Feb. 17, 1958, Ser. No. 715,569
2 Claims. (Cl. 209—102)

The present invention relates to an article sizing machine and more particularly to a machine for separating tender or otherwise easily damaged articles, and especially fruits and vegetables which are easily bruised, into predetermined sizes.

In the past, the successful automatic grading of strawberries and other tender fruits and vegetables has been regarded as impossible without substantial damage and loss of the fruit. For example, the normal expected loss for strawberries so graded was 25%. It has been known to employ vibratory screens of the type used in grading gravel and stones for the purpose of segregating strawberries according to size. Such a screen usually includes holes one and one-quarter inches in diameter, and spaced apart on one and one-half inch centers; and is submersed in water in a declined position. The strawberries are dumped onto the screen and distributed therealong by water rushing across the screen and/or by vibration of the screen. It has been found that the water forces the strawberries against the edges of the holes in the screen cutting and otherwise damaging the berries. In addition, a grading screen is not readily suited to segregation of the fruit in spaced predetermined locations along the screen so that various sizes may be taken off at different positions.

It has also been known to use elongated rollers defining a slot therebetween of increasing width from one end of the rollers to the other as a grading device. The rollers are rotated to tumble fruit or vegetables delivered therebetween and to cause them to descend through the slot when their widths correspond to the widths of the slot. These machines are unsatisfactory for the grading of strawberries and similar articles because the fruit rubs against, or is squeezed between, the grading rollers.

In addition to an inability to handle fruits and vegetables gently, the grading machines of the prior art have not been sufficiently durable and dependable for grading perishable articles. With fresh strawberries, for example, breakdown delays of even one or two hours has been known to lower the grade of the picked fruit and thus to depreciate the harvested crop.

Accordingly, it is an object of the present invention to provide a sizing machine for segregating fruits, vegetables, and other articles, especially those which are easily bruised, according to predetermined size classifications.

Another object is to provide a grading machine for handling articles to be graded in a gentle manner.

Another object is to enable the accurate grading of easily bruised articles without damage or detectable loss.

Another object is to minimize contact between a grading machine and the articles to be graded thereby.

Another object is to prevent damage to fruit being graded due to delays as a result of machine failure and breakdown.

Another object is to provide an endless cable including movable grading runs precisely spaced apart to define grading slots which are of progressively increased width for grading purposes.

Another object is to provide a cable as described in the preceding paragraph which has chemical and mechanical characteristics necessary to perform dependably in the described grading tasks.

Another object is to vibrate gently the runs of the cable to turn the articles to be graded and thereby to facilitate more accurate grading.

Another object is to provide a grading machine which is excellently suited to blending of articles of various sizes in a common container.

Other objects are to provide a sizing machine which is durable in construction, economical, dependable in operation, adapted to use with a variety of articles to be graded, and which is highly effective for accomplishing its intended purposes.

These, together with other objects, will become more fully apparent upon reference to the following description and accompanying drawings.

In the drawings:

FIG. 1 is a top plan view of an article sizing machine constructed in accordance with the principles of the present invention but with top transverse frame members omitted to enable observation of the grading cable. Cable spacing members are also omitted for clarity.

FIG. 2 is a longitudinal vertical section taken on line 2—2 of FIG. 1.

FIG. 3 is a somewhat enlarged horizontal section taken on a plane at a position represented by line 3—3 FIG. 2.

FIG. 4 is a somewhat enlarged fragmentary longitudinal section of a roller employed in the present invention.

FIG. 5 is a somewhat enlarged, fragmentary plan of a roller and a plurality of upper runs of the grading cable employed in the present invention.

FIG. 6 is a fragmentary, somewhat enlarged, transverse vertical section taken on line 6—6 of FIG. 7.

FIG. 7 is a somewhat enlarged, fragmentary plan view looking from a position indicated at 7—7 in FIG. 2.

Referring more particularly to the drawings, an elongated substantially rectangular frame is generally indicated by the numeral 10 and includes a plurality of vertically disposed legs 11 at the corners of the frame and near the middle thereof. A pair of lower longitudinal frame members 12 interconnect the legs on opposite sides of the frame, and lower transverse frame members 13 interconnect the legs at opposite ends of the frame. Further, a plurality of lower transversely extended intermediate frame members 14 interconnect the longitudinal frame members 12. As best seen in FIG. 3, a longitudinally extended intermediate frame member 15 is extended from one of the lower transverse frame members 13 to an intermediate transverse frame member 14, and a plurality of longitudinally spaced angle irons 16 are transversely supported on the intermediate longitudinal member 15 and the longitudinal side frame members 12.

The frame 10 provides an article receiving end generally indicated by the numeral 20 and an oppositely extended end, generally indicated by the numeral 21. A pair of elongated longitudinally extended upper frame members 22 interconnect the legs 11 at opposite ends of the frame above the lower frame members 12 and 13. These upper frame members provide end portions which are upwardly inclined toward the center of the frame and meet in an upper apex or edge. These frame members may be regarded as being upwardly arched. Further, the frame includes a plurality of longitudinally spaced transversely extended upper frame members 23.

An elongated drive guide sheave 30 provides an elongated shaft 31 journaled in bearings in the extended end 21 of the frame 10 immediately below the upper longitudinal frame members 22. The drive sheave includes a plurality of longitudinally equally spaced substantially circular reels 32 having annular grooves 33 concentric to the shaft and thus also equally spaced longitudinally of the shaft.

An elongated driven guide sheave 36 provides an elongated shaft 37 rotatably journaled in the article receiving end 20 of the frame 10 in substantially the same horizontal plane as the drive sheave 30. The driven sheave includes a plurality of circular reels 38 secured to the shaft and divided into two groups 39 and 40 at opposite ends of the shaft. The reels are of the same diameter as the reels 32 and provide annular grooves 41. The grooves in the reels of each group are longitudinally equally spaced from each other. Each of the groups of reels provides half of the number of grooves as are in the drive sheave 30. Further, the spacing between adjacent grooves in each reel is less than the spacing between adjacent grooves in the drive sheave.

Substantially cylindrical lower idler drums 46 and 47 provide endwardly extended axles 48 rotatably journaled in the article receiving end 20 and the extended end 21, respectively, of the frame 10 below and inwardly of the drive and driven sheaves 36 and 30, respectively, as best seen in FIG. 2. The drums extend substantially the full length of the reels 32 and 38 of the drive and driven sheaves, as best seen in FIG. 1.

A plurality of intermediate shafts 55 are journaled in the upper longitudinal frame members 22 in substantially equally longitudinally spaced relation to each other and to the sheaves 30 and 36 and in substantially parallel relation to each other and to the sheaves. Rollers 56 are journaled on roller bearings 57 mounted on the opposite ends of the shafts and are eccentric of their shafts, as best seen in FIG. 4. The rollers provide a plurality of axially spaced annular ribs having circumscribing annular grooves 58 formed in the tops of the ribs. The ribs are separated by annular circumscribing recesses 59. As with the driven sheave 36, the grooves and the recesses are divided into two groups with the grooves of each group on any one roller being equally spaced axially of such roller. The rollers have upper peripheries which are in upwardly arched relation from opposite ends of the frame 10 toward the middle thereof so that the upper peripheries of the rollers are all above the peripheries of the sheaves 30 and 36 and the upper peripheries of the center roller is at the highest point of the arch. For a purpose soon to be evident, the depth of the recesses measured radially of the rollers is at least as great as the distance between adjacent grooves 58, as best illustrated in FIG. 4. Furthermore, the rollers have the same number of grooves as the sheaves 30 and 36. However, adjacent grooves 33 and 41 of the sheaves and the grooves of the rollers are progressively spaced farther apart from the article receiving end 20 of the frame 10 to the extended end 21, as best seen in FIG. 1, so that corresponding grooves transversely of the sheaves and rollers are substantially aligned longitudinally of the frame along straight lines divergent toward the extended end of the frame.

With further reference to the rollers 56, it is to be noted from FIG. 2 that they are not only eccentric with respect to their shafts but that their eccentricities are out of phase. That is, they are eccentric in different directions so that during rotation the peripheries of some are moving upwardly at the same instant that the peripheries of others are moving downwardly. The reason for this will also be readily apparent from the subsequent description. As with the drums 46 and 47, the rollers are freely rotatable on their shafts 55.

With particular reference to FIGS. 2 and 3, a pair of U-shaped floating brackets or pulley blocks 66 provide horizontally extended legs 67 interconnected by vertical return bends 68. The lower horizontal legs longitudinally slidably engage the transverse angle arms 16. Vertical pins 69 are extended between the legs, and eyelets 70 are connected to the return bends. Horizontal pulleys 71 are rotatably journaled on the pins. An elongated shaft 73 is journaled in bearings at the lower end of the frame 10 below the driven sheave 36, and four vertically disposed pulleys 74 are secured to this shaft in longitudinally spaced relation therealong, as shown in FIG. 3. The two pulleys on one end of the shaft are spaced substantially the same distance as the diameter of the horizontal pulleys 71 and are equidistantly spaced on opposite sides of the axis of the horizontal pulley on their side of the frame. The same is true at the other side of the frame with the pulleys 71 and 74.

A pair of elongated moisture and acid resistant, abrasion and corrosion proof, substantially cylindrical, smooth surfaced, endless cables 80, preferably of polyester film twisted into strands, is extended around the sheaves 30 and 36, the rollers 56, the drums 46 and 47, and the pulleys 71 and 74 on each side of the frame 10. Each cable provides transversely spaced upper runs 81 fitted in longitudinally aligned grooves 33, 58, and 41, and transversely spaced lower runs 82 extended between and engaging the idler drums 46 and 47. The upper runs are substantially tangential to imaginary cylinders, not shown, extended longitudinally of and above the upper runs, these imaginary cylinders being also above and out of contact with adjacent edges of the grooves 58, all as best understood by reference to FIG. 4.

The upper runs 81 of each cable provide slots 85 therebetween of progressively increased width from the article receiving end 20 to the extended end 21 of the frame 10. For strawberries, for example, the cable 80 is approximately 1/4" in diameter, and the upper runs are preferably spaced approximately 5/8" apart at the article receiving end 20 and approximately 1 1/2" apart at the extended end 21. Because of the location of the groups 39 and 40 of grooves 41 in the reels 38, the sizing machine is actually divided into two sizing sections 87 and 88 at opposite sides of the frame, each accommodating a cable. The outermost upper runs 89 of the sections 87 and 88 are extended downwardly over the vertical pulleys 74 and thence longitudinally of the frame 10 toward the article receiving end and integrally joined around the pulleys 71 to provide loops 90.

The above noted characteristics of the cable 80 are found to have extreme importance in the grading of certain fruits and vegetables, such as strawberries for example. It has been found that a cable of polyester film twisted into strands and sold by E. I. du Pont de Nemours and Co., Inc. under their trademark "Mylar" is excellently suited to the purpose. The cable is sometimes referred to as "plastic rope." It has the further characteristic that it can be cut with a hot knife and thereafter the cut ends joined by heat in substantially their original form. The advantage of this feature is evident in the present invention because of the desirability of making the cable endless.

With reference to FIG. 3, pairs of spaced arms 95 are inwardly extended from the lower transverse frame member 13 at the extended end 21 of the frame 10, and horizontal pins 96 are individually mounted between the pairs of arms. Vertical pulleys 97 are journaled on the pins, and elongated flexible tie members 98 have ends individually connected to the eyelets 70, and opposite ends extended over the vertical pulleys and connected to weights 99. The weights are thus adapted to exert tension on the cable 80 so that it is in tight frictional engagement against the sheaves 30 and 36, the idler drums 46 and 47, the rollers 56, and the pulleys 71 and 74.

Described differently, it will be seen that the endless cable 80 has upper runs which are fitted in corresponding grooves of the sheaves 30 and 36 and the rollers 56 between the sheaves. Intermediate each successive upper run, the cable 80 returns beneath the idler drums 46 and 47 and then continues in the next adjacent upper run. As previously described and as evident in FIG. 1, each of the cables 80 in effect comprises a separate grading table or section. The outermost upper runs of each such section extends downwardly about the vertical pulley 74 in downward alignment therewith, and thence about the horizontal pulley 71 in the floating block 67 intermediate its respective vertical pulleys 74. The cable of each such section is maintained in an adequately taught condition for accurate grading purposes even though the upper runs thereof are continuously engaged with the eccentric rollers 56, by the tie member 98 connected to the block 27, passed over the pulley 97, and supporting the weight 99. Such cable tensioning means has been found excellently suited to the maintenance of constant and adequate tension in the cable during grading operations and even though the upper runs of the cable are vertically reciprocated by the rollers 56.

An elongated bar 105 is extended transversely between the longitudinal frame members 12 adjacent to the article receiving end 20 of the frame 10 but below and in advance of the idler drum 46. Spacers 106 are secured to the bar in longitudinally spaced relation therealong and include erect pins 107 having sleeves 108 releasably downwardly fitted over the pins. The pins extend upwardly between adjacent lower runs 82 of the cable 80 and the sleeves engage adjacent lower runs to hold them in predetermined precisely spaced relation to each other. In certain embodiments of the invention the upper runs 81 are passed through the grooves 58 in the rollers 56 every twenty-four inches linearly of the upper runs, and in such embodiments, the overall length of the frame is twenty-five feet. It is obviously critical that the runs of the cable are straight between the sheaves 30 and 36 in order to maintain accurate grading.

A support platform 115 is secured to the upper longitudinal frame member 22 at one side of the frame 10 and at the extended end 21 thereof. A drive motor 116 is mounted on the platform for rotating a drive shaft 117 by a system of gears, not shown. The drive shaft extends transversely outwardly of the frame, and a drive sprocket 118 is secured to the drive shaft. A driven sprocket 119 is connected to an end of the shaft 31 for the drive sheave 30, and an elongated endless chain 120 is extended around the sprockets.

*Operation*

The operation of the described embodiment of the subject invention is believed to be readily apparent and is briefly summarized at this point. The motor 116 is energized to rotate the shaft 31 and thus the drive sheave 30 in a counterclockwise direction, as viewed in FIG. 2. Because the weights 99 tension the cable 80, it is held against the drive sheave and traveled longitudinally of its runs 81 and 82 by the drive sheave preferably at a velocity of one hundred and twenty feet per minute although this is not critical. Further, because the cable is held against the driven sheave, the rollers 56, the drums 46 and 47, and the pulleys 71 and 74, all of these are also rotated by the motor. It will be evident that the upper runs 81 are motivated in a direction from the article receiving end 20 of the frame 10 toward the extended end 21 and thence around the drive sheave and the idler drum 47, and that the lower runs 82 travel in a reverse direction toward the article receiving end. The upper runs are maintained in precise transversely spaced relation by the longitudinally aligned grooves 33, 41, and 58, as previously described. The spacers 106 also help to maintain the lower runs 82 in alignment with the grooves 33. These spacers are especially desirable inasmuch as the lower runs of the cable travel substantialy the full length of the frame after leaving the sheave 30 and the drum 47 without the advantage of any guiding or spacing means, such as the rollers for the upper runs. In other words, the spacers prevent the lower runs from jumping over or between adjacent grooves in the driven sheave 36.

Strawberries, as 125, are delivered to the article receiving end 20 of the frame 10 whereupon they are carried toward the extended end 21 by the traveling upper runs 81 of the cable 80. The grading action in both of the sections 87 and 88 is identical. As the upper runs rotate the rollers 56, the rollers gently oscillate the upper runs vertically because of the eccentricities of the grooves 58. To increase vibration of the runs, the eccentricities of the rollers are preferably out of synchronism (as shown in slightly exaggerated side elevation in FIG. 2), and especially when used with certain fruits such as strawberries. This vibration causes the fruit to turn gently to facilitate orienting the fruit on the upper runs to positions with their minimum diameters or widths normal to the cable runs. The strawberries travel along the frame until their widths correspond to the widths of the slots 85 between the runs whereupon they gravitate downwardly through the upper runs into transversely extended conveyer belts, or the like, not shown, therebelow. In this regard, it is to be noted that where the fruit is easily bruised, it may be dropped from the upper runs into slowly traveling water, not shown, whereby the current thereof moves the fruit to a predetermined location.

Because of the material of the cable 80 and the gentleness with which it engages the fruit, there is no detectable damage during grading. A further significant feature in this regard is the provision of the annular recesses 59 in the rollers 56. Although the rollers are necessary in maintaining the proper spacing of the upper runs and in vibrating the runs, it is important that the fruit does not rub or contact the rollers because of the resultant bruising which would occur. Accordingly, the recesses are of a depth equal to or greater than the spacing of adjacent edges of the grooves 58 so that, as indicated in FIGS. 4 and 5, the fruit never contacts the roller. If the fruit is of such size as to pass over the roller, it is wide enough to bridge the recesses and rest on the upper runs. If it is of such size as to fit between the adjacent edges of a groove down into the recess therebetween, it will drop through the slots before reaching the roller.

From the foregoing it will be evident that a highly desirable grading machine has been provided which is excellently suited for grading articles and especially fruits and vegetables which are easily bruised or similarly damaged. The machine has been found suited for use not only with strawberries but artichoke hearts, tree ripened peaches, olives, and the like. In contrast with the prior art, the subject machine is able accurately to grade fruit and vegetables of this nature without any detectable damage or loss. The "Mylar" cable employed has been found uniquely suited for use in this machine and as a result, the machine has been found to operate successfully over long periods of time without breakdown so that passage of fruit and vegetables through the machine is rapid.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described our invention, what we claim as new and desire to secure by Letters Patent is:

1. In a machine for sizing relatively soft and easily bruised articles having an acid and moisture content, such as strawberries, an elongated frame having an article receiving end and an oppositely extended end; a drive sheave including an elongated substantially concentric shaft transversely journaled in the extended end of the frame and having a plurality of axially spaced circumscribing grooves; a driven sheave including an elongated substantially concentric shaft transversely journaled in the article receiving end of the frame in substantially the same horizontal plane as the drive sheave and having a plurality of axially spaced circumscribing grooves equal in number to the grooves on the drive sheave; a pair of lower idler drums transversely journaled in the frame in substantially horizontal coplanar relation below and inwardly adjacent to the sheaves, a plurality of elongated substantially cylindrical rollers eccentric to individual longitudinal axes therefor and axially transversely freely rotatably journaled in the frame in longitudinally spaced relation between and above the sheaves, the axes of the sheaves and the rollers lying in an upward arch having its highest point substantially equidistantly spaced from the sheaves, the rollers each having a plurality of axially spaced annular ribs individually circumscribed by annular grooves, said rollers having circumscribing annular recesses between the ribs, each of the rollers having the same number of grooves as the sheaves, adjacent grooves of the sheaves and the rollers being gradually spaced farther apart from the article receiving end to the extended end of the frame so that corresponding grooves are substantially aligned along lines longitudinally diverging from the receiving to the extended end of the frame; a substantially horizontal pulley mounted on the frame for adjustable movement longitudinally of the frame below and between the drums for rotatable movement around a substantially erect axis; a pair of substantially erect pulleys mounted on the frame for rotatable movement about substantially horizontal axes below the driven sheave and spaced longitudinally of the frame from said sheave; an elongated moisture and acid resistant, abrasion and corrosion proof, substantially cylindrical, smooth surfaced, endless cable of Mylar polyester film wound around the sheaves, the rollers, the drums, and the pulleys to provide upper and lower runs, the upper runs resting in said corresponding longitudinally aligned grooves and extending above the peripheries of their respective ribs so that adjacent runs define slots of progressively increased width from the article receiving end to the extended end of the frame; rotary drive means mounted on the frame and connected to the drive sheave for imparting rotation thereto; weighted means connected to the horizontal pulley to tension the cable against the sheaves, rollers, drums and pulleys whereby the upper runs of the cable are moved in the same direction from said receiving end to said extended end for urging articles from the receiving end toward said extended end and whereby the lower runs are moved from the extended end toward the receiving end, said articles gravitationally descending through the slots where their respective widths are less than the widths of the slots, the tension of the cable against the rollers effecting rotation thereof, the rollers being initially angularly adjusted under the pressure thereagainst of the cable so that their eccentricities extend in different directions from their respective axes and so as gently to oscillate the upper runs vertically whereby the articles are turned to facilitate their descent through the slots at precise positions, the radial depths of the annular recesses in the rollers being at least as great as the spacing of the upper runs rested in the grooves of their adjacent ribs whereby articles rested on the upper runs over the rollers do not contact the rollers but rest on the upper runs in spanning relation to the recesses; an elongated bar mounted in the frame transversely beneath the lower runs, and between the idler drums but relatively closely adjacent to the idler drum at the article receiving end; and spacers upwardly extended from the bar in substantially the same spaced relation as the width of the grooves and individually extended between adjacent lower runs to maintain exact spacing therebetween prior to movement onto the driven sheave.

2. In a machine for sizing relatively soft and easily bruised articles having an acid and moisture content, such as strawberries; an elongated frame having an article receiving end and an oppositely extended end; drive and driven sheaves respectively journaled in the extended and receiving ends of the frame for rotation about individual longitudinal axes for the sheaves, each of the sheaves having a plurality of axially spaced circumscribing grooves; a plurality of elongated substantially cylindrical rollers rotatably journaled in the frame in longitudinally spaced relation between the sheaves, the rollers each having a plurality of axially spaced ribs in circumscribing relation thereto, said ribs having annular recesses therebetween and providing circumscribing grooves in their peripheries, the sheaves and rollers having axially spaced corresponding grooves with said corresponding grooves substantially aligned longitudinally of the frame; an elongated moisture and acid resistant, abrasion and corrosion proof, substantially cylindrical, smooth surfaced, endless cable of Mylar polyester film wound around the sheaves and the rollers to provide upper and lower runs, the upper runs being individually rested in said corresponding longitudinally aligned grooves so that adjacent runs define slots of predetermined width from the article receiving end to the extended end of the frame, the upper runs being extended above the upper edges of the ribs; powered drive means mounted on the frame and connected to one of the sheaves for imparting rotation thereto whereby the upper runs of the cable are moved in the same direction from said receiving end to said extended end for urging articles from the receiving end toward said extended end and whereby the lower runs are moved from the extended end toward the receiving end, and whereby such articles gravitationally descend through the slots where their respective widths are less than the widths of the slots, the radial depths of the annular recesses in the rollers being at least as great as the spacing of the upper runs rested in the grooves of their adjacent ribs whereby articles rested on the upper runs over the rollers do not contact the rollers but rest on the upper runs in spanning relation to the recesses; an elongated bar mounted in the frame transversely beneath the lower runs and between the idler drums but relatively closely adjacent to the idler drum at the article receiving end; and spacers upwardly extended from the bar in substantially the same spaced relation as the width of the grooves and individually extended between adjacent lower runs to maintain exact spacing therebetween prior to movement onto the driven sheave.

References Cited in the file of this patent

UNITED STATES PATENTS

| 427,660 | Beach | May 13, 1890 |
|---|---|---|
| 1,232,052 | Landahl | July 3, 1917 |
| 1,360,850 | Wiseman | Nov. 30, 1920 |
| 1,534,663 | Sammis | Apr. 21, 1925 |
| 1,841,333 | Kyle | Jan. 12, 1932 |
| 1,893,938 | Ghent | Jan. 10, 1933 |
| 2,526,161 | Sammis | Oct. 17, 1950 |

FOREIGN PATENTS

| 375 | Netherlands | Dec. 1, 1916 |